United States Patent [19]

Blenkinsop et al.

[11] 4,237,396
[45] Dec. 2, 1980

[54] ELECTROMAGNETIC MACHINES WITH PERMANENT MAGNET EXCITATION

[75] Inventors: Philip T. Blenkinsop, Melbourn; Graham W. McLean, Lyme; David Turner, Haslingfield, all of England

[73] Assignee: P A Management Consultants Limited, London, England

[21] Appl. No.: 947,046

[22] Filed: Sep. 29, 1978

[30] Foreign Application Priority Data

Oct. 6, 1977 [GB] United Kingdom ............... 41539/77
Oct. 6, 1977 [GB] United Kingdom ............... 41541/77
Oct. 6, 1977 [GB] United Kingdom ............... 41542/77

[51] Int. Cl.³ ..................... H02K 21/26; H02K 1/22
[52] U.S. Cl. .................... 310/154; 310/216; 310/268
[58] Field of Search .............. 310/43, 44, 154, 156, 310/254, 261, 263, 268, 262, 112, 216–218

[56] References Cited

U.S. PATENT DOCUMENTS

| | | | |
|---|---|---|---|
| 2,758,231 | 8/1956 | Welter | 310/268 |
| 3,303,371 | 2/1967 | Moressee et al. | 310/268 |
| 3,315,106 | 4/1967 | Reynst | 310/268 |
| 3,529,191 | 9/1970 | Baudot | 310/154 X |
| 3,700,943 | 10/1972 | Heintz | 310/268 X |
| 3,984,709 | 10/1976 | Kuwako | 310/154 X |
| 3,999,092 | 12/1976 | Whiteley | 310/268 X |
| 4,011,475 | 3/1977 | Schmider | 310/268 X |

Primary Examiner—Mark O. Budd
Attorney, Agent, or Firm—Oblon, Fisher, Spivak, McClelland & Maier

[57] ABSTRACT

An electromagnetic machine (particularly an electric motor) based on the design described in British Patent Application No. 48794/74.

Iron losses in this type of machine are reduced by laminating the rotor backing plate (2,4). Although a spiral lamination (FIG. 3) is preferred, an axial stack of insulated plates (FIG. 2) may be employed.

Interpolar flux leakage is reduced by radially staggering the U-shaped pole pieces around the stator coil (FIG. 4). In addition or alternatively differently shaped pole pieces may be employed, alternately, around the stator assembly (FIG. 5).

Eddy current losses are reduced by replacing the backing plates (2,4) and separate magnets (1,1a,3,3a) with plates (12,14) of sintered magnetic material, permanently magnetized to present alternate North and South poles, therearound.

Alternatively eddy current losses are reduced by forming the backing plates from sintered ferrite material (16,18) and mounting either an array of discrete magnets (20,20a,22,22a) or a magnetized ring such as (16,18), therearound.

5 Claims, 7 Drawing Figures

ELECTROMAGNETIC MACHINES WITH PERMANENT MAGNET EXCITATION

DESCRIPTION

FIELD OF INVENTION

This invention concerns electromagnetic machines such as motors and generators.

BACKGROUND TO THE INVENTION

There have been many developments in the field of electromagnetic machines one of which has been to develop an electromagnetic machine typically embodied as a motor which incorporates a circular array of permanent magnets and a similarly arranged plurality of pole pieces around a stator which are energised by a coil so as to produce alternate North and South poles therearound. The rotating field is obtained by commutating the current flowing in the coil so as to obtain interaction between the pole pieces and the permanent magnets. This design allows a very thin motor or other machine to be produced and has the advantage that the power available can be increased by simply mounting additional units on a single drive shaft in the form of a stack.

PRIOR ART

One form of electromagnetic machine constructed in accordance with this general principle is known from British Patent Application No. 48794/74 in which the stator comprises an annular array of U-shaped pole pieces arranged around an annular coil so as to form alternate North and South poles therearound. The rotor comprises one (or two) discs mounted on one side (or both sides) of the stator and is attached to a shaft which passes through an aperture in the stator. Usually two such rotor discs are employed. On each disc are circularly arranged the magnets which present alternately North and South poles to the stator.

FIG. 1 of the accompanying drawings illustrates diagrammatically one embodiment of such a machine. Rotation of the rotor assembly is achieved by supplying electric current to the stator coil either through a commutator so as to produce magnetic pole reversal of the stator U-shaped pole pieces as the rotor rotates through the angular distance between the magnets on the rotor disc (or discs), or by supplying alternating electric current to the coil around the stator.

It will be seen that the magnetic flux in the rotor assembly will fluctuate at twice the frequency of the alternation of the current flowing through the stator coil (whether alternating due to commutation or because it is alternating current that is supplied to the coil).

This results in high iron losses in the rotor assembly.

The power output of this type of machine when operating as a motor is commonly found to be restricted by the inductance of the armature coil.

OBJECTS OF THE INVENTION

It is an object of the present invention to provide alternative forms of construction for this type of machine so as to reduce the high iron losses which otherwise arise.

It is another object of the present invention to provide an alternative method of construction of this type of machine so that when operating as a motor the effective inductance of the stator coil is reduced.

THE INVENTION

According to one aspect of the present invention in an electromagnetic machine of the type referred to the rotor backing plates which support the two circular arrays of magnets are laminated with the parallel planes of the laminations running parallel to the direction of maximum flux density in the backing plate.

Because the magnets are mounted on one face of the backing plate the regions of maximum flux density will occur between the magnets so that the maximum flux density lies in an annular band around the disc immediately behind the magnets mounted thereon.

In one embodiment of the invention the backing disc is formed from a large number of concentric rings of magnetisable material each one having a diameter slightly greater than the preceding one and insulated from its immediate neighbours.

In another embodiment the backing disc is formed by winding a single elongate strip of magnetisable material having an insulating surface on at least one face, into a spiral in which adjoining turns touch.

Although the ideal plane of lamination is as will be obtained by the laminating procedure of the first two embodiments mentioned, there is a third preferred embodiment which is easier to construct. According to a third embodiment of the invention the backing plate is formed from a plurality of thin discs of magnetisable material stacked side by side with insulating layers between adjoining discs.

Although the plane of the laminations in the preferred embodiment is not in the ideal plane with respect to the magnetic flux path it is found in practice that when using sintered ferrite and similar materials for the magnets the low value of flux density which appears in the backing disc immediately behind the magnet is sufficiently low to be of small consequence and in the area of high flux density in the backing plate between the magnets the orientation of the laminations is appropriate in that it runs parallel to the lines of force and low iron losses result.

According to another aspect of the present invention in an electromagnetic machine of the type described the U-shaped pole pieces which are arranged around the annular coil to form the stator assembly are alternately radially displaced so that the interpolar flux paths between the bridging section of one pole piece and the separate poles of an adjoining pole piece are increased so as to reduce interpolar flux leakage.

The U-shaped pole pieces are preferably laminated as described in the aforementioned British Patent Application No. 48794/74 and the circular array of magnets forming each of the rotor discs may be constructed as shown in FIG. 1 of the accompanying drawings or may be formed from sintered ferrite material and the magnets circularly arranged therearound may be formed by permanently magnetising the different regions of a single circular flat faced member or by mounting separate permanent magnets on a backing disc of soft iron or sintered ferrite composite material.

According to a third aspect of the present invention the rotor is formed from a relatively thick ring of magnetic material which is magnetised so as to present alternately therearound South and North poles, the magnetic material forming not only the magnets but also the backing path for the rotor.

Preferably the material from which the rotor plate is formed is sintered so as to reduce eddy current losses.

The rotor assembly constructed in accordance with this aspect of the invention has the advantage that the effective magnet path length is increased which reduces the total flux pulsation for a given magneto motive force exerted from the armature. This reduces the hysteresis loss.

According to a fourth aspect of the invention the rotor is formed from a ring of soft iron or ferrite composite material which serves as a backing for a plurality of separate magnets which are arranged in a circular array to present alternately North and South poles or as a backing for a complete ring of permanent backing material which is magnetised to present alternate South and North poles around its circular faces.

In an arrangement in accordance with this fourth aspect of the invention the material forming the ring is preferably sintered.

IN THE DRAWINGS

FIG. 1 illustrates by way of an exploded perspective view one embodiment of the known form of machine, FIG. 2 is an edge view of part of a motor constructed as one embodiment of the present invention, FIG. 3 is a cross-section through part of another embodiment of the invention.

FIG. 4 illustrates the principle of staggering provided by the second aspect of the present invention so as to reduce interpolar flux leakage between adjoining poles in the stator assembly, FIG. 5 is a view of another alternative arrangement for reducing interpolar flux leakage, FIG. 6 illustrates part of an electric motor assembly constructed in accordance with the third aspect of the invention and shows the magnetic path through the rotor backing plate, and FIG. 7 illustrates by way of a similar view another electric motor assembly constructed in accordance with the fourth aspect of the invention and also illustrates the magnetic path through the armature and rotor assembly.

DETAILED DESCRIPTION OF THE DRAWINGS

Figure 1:
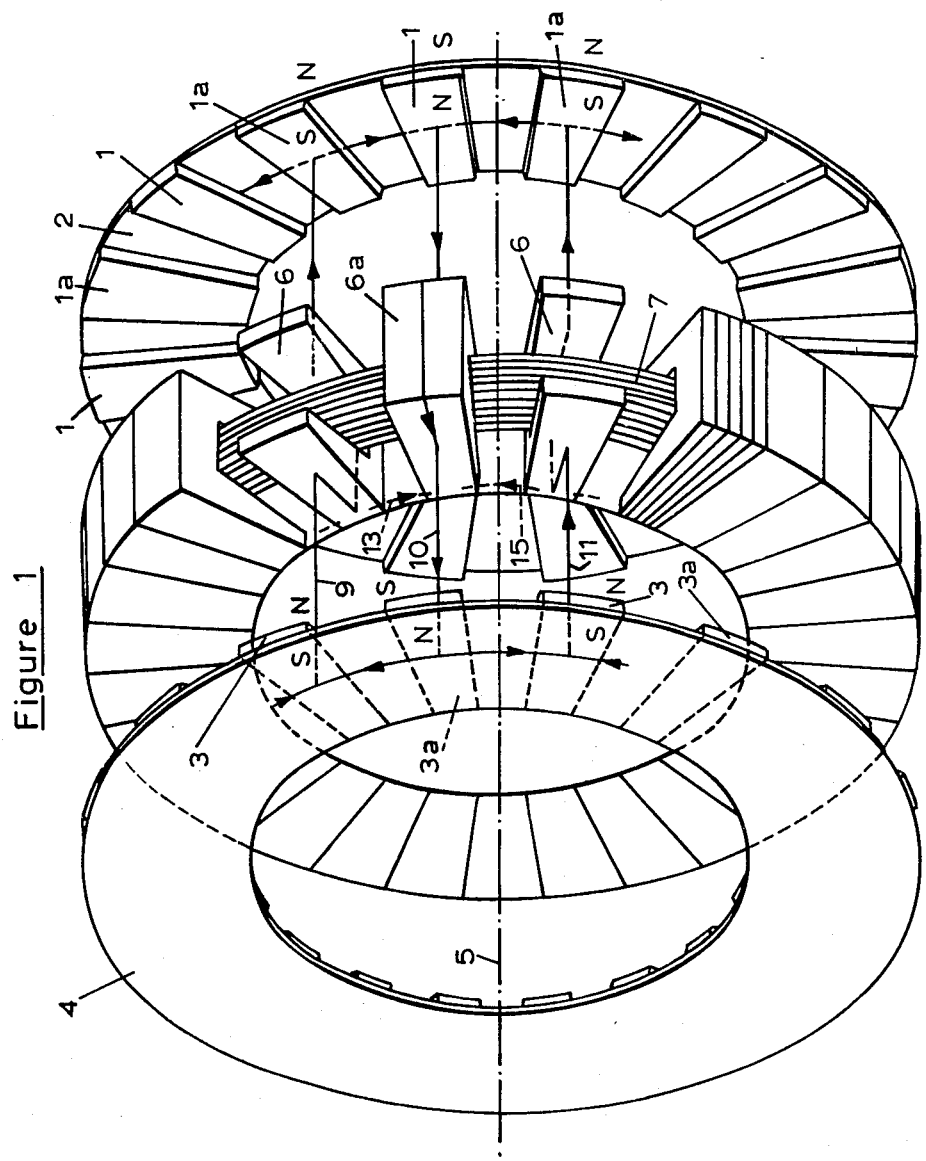

FIG. 1 corresponds to FIG. 1 of the drawings accompanying British Patent Application No. 48794/74 and reference is made to that application for detail of the construction and operation of the motor illustrated in FIG. 1.

Figure 2:
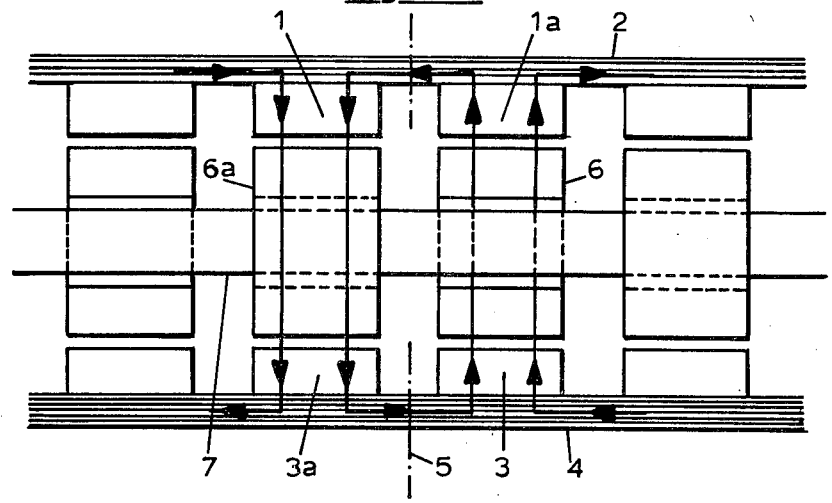

FIG. 2 illustrates how iron losses in the rotor plates 2 and 4 can be reduced. To this end each of the rotor plates is formed from an axial stack of discs of magnetisable material such as new metal.

It will be seen that although the plane of the laminations in each of the discs 2 and 4 is perpendicular to the magnetic field immediately behind each of the magnets, 1, 1a in the case of plate 2 and 3, 3a in the case of plate 4, the flux density in that region will be relatively low because of the large area involved and it is only when the magnetic field has to turn through a right angle and travel through the plate that the flux density becomes appreciable due to the considerably smaller area of cross-section available to the field. This arises from the fact that the plates 2 and 4 are ideally kept as thin as is compatible with the rigidity required to support the two circular arrays of magnets.

Figure 3:
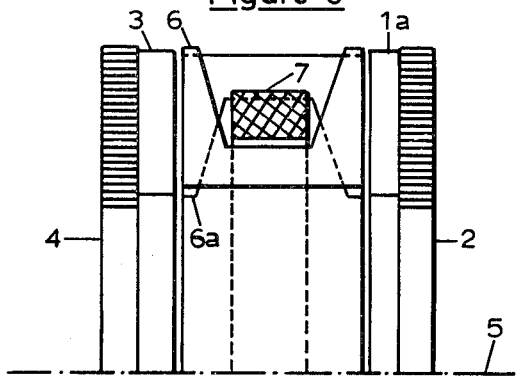

FIG. 3 of the drawings illustrates an alternative embodiment of the invention in which the plates 2 and 4 are each formed from a spiral winding of a single strip of magnetisable material as shown in cross-section. In this event the plane of the lamination obtained in the plate 2 or 4 is exactly correct both as regards the magnetic field leaving the rear of the magnets such as 3 and 1a which are shown in FIG. 3 and also when the magnetic field has had to turn through a right angle in order to traverse a section of a disc 2 or 4 so as to travel to one of the adjoining magnets. However it will be appreciated that the method of constructing a spiral laminated disc such as shown in FIG. 3 is somewhat more complicated than forming an axial stack of discs to form a plate such as shown in FIG. 2 and in consequence FIG. 2 represents the more preferred embodiment.

In addition to the magnetic flux paths between axially spaced faces of magnets and pole pieces such as 9, 10 and 11 which are shown in FIG. 1, interpolar flux paths exist between the bridging section of each pole piece and the adjoining poles of adjacent pole pieces. These interpolar flux paths are denoted by the dotted lines denoted by reference numerals 13 and 15 and it is one of the objects of the present invention to reduce the flux leakage along these interpolar flux paths.

Figure 4:
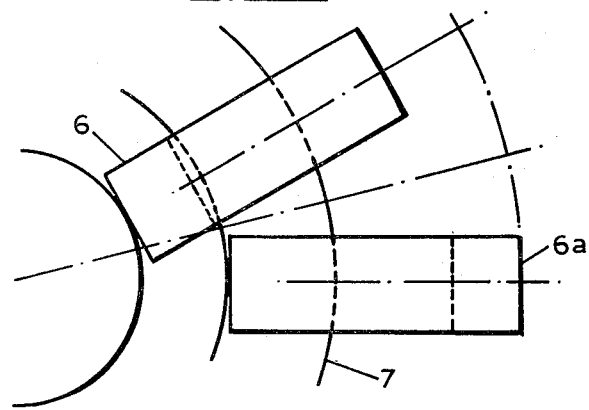

This is achieved by radially displacing adjoining U-shaped pole pieces 6 and 6a, as shown in FIG. 4.

In FIG. 4 the pole pieces 6a in which the bridging section is radially outermost are displaced in a radially outward direction.

The other pole pieces 6 in which the bridging section is located radially inboard of the coil 7 are not displaced but are left in their original position similar to that shown in FIG. 1.

In this way the North and South poles of the U-shaped pole pieces 6a are moved away from the inboard bridging sections of the poles 6 and the result is a reduction in the interpolar flux leakage between adjoining U-shaped pole pieces.

Although not shown the same result can be obtained by radially displacing the U-shaped pole pieces 6a by half the amount shown in FIG. 4 and inwardly radially displacing the pole pieces 6 by a corresponding distance.

Figure 5:
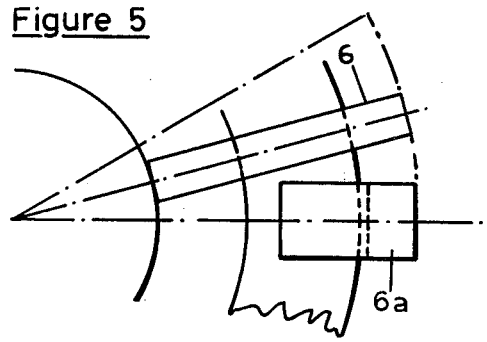

The U-shaped pole pieces 6a (i.e. those in which the bridging section is radially outermost) need not be of the same form as the U-shaped pole pieces 6 (i.e. those in which the bridging section is radially inmost) and as shown in FIG. 5 a reduction in interpolar flux leakage can be obtained by forming the U-shaped pole pieces 6a as radially short and stubby members but compensated by a greater width in the circular direction relative to the pole pieces 6a which are formed of greater radial length but are narrow in the circular direction.

A typical modified pole piece 6a is shown at 6a' and a typical modified pole piece 6 is shown at 6' in FIG. 5.

All aspects of the invention as shown in the accompanying drawings are applicable to motors which incorporate a single rotor disc on one side of the stator assembly as well as to motors incorporating two rotor discs (i.e. on both sides of the stator assembly).

Likewise all aspects of the invention may be applied to linear motors and radial flux machines operating on the same principle as that embodies in the motor shown in FIG. 1.

Figure 6:
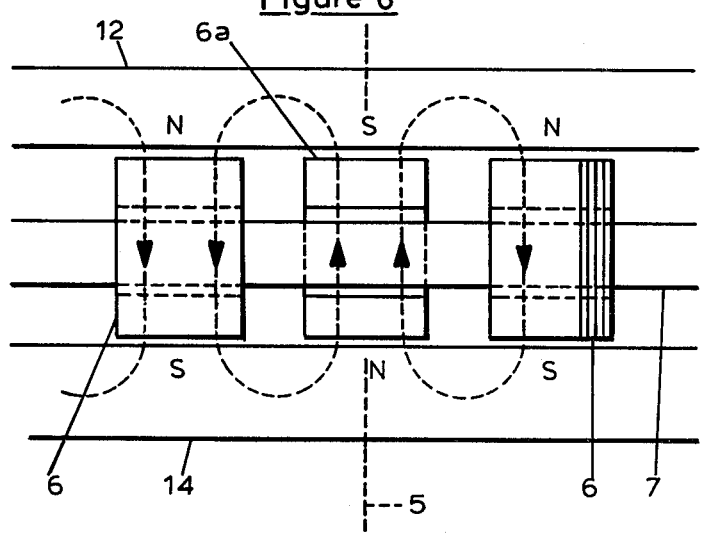

FIG. 6 illustrates an embodiment of the third aspect of the present invention in which the two rotors (normally formed by steel backing plates 2 and 4 with a plurality of magnets 1, 1a, 3a mounted thereon as in FIG. 1) are replaced by two rings of magnetic material 12 and 14 respectively. Each of the rings is formed from sintered material to reduce the current losses.

The rings 12 and 14 are permanently magnetised so as to provide a plurality of equally circularly spaced alternate North and South poles therearound as denoted by the letters S and N.

The annular stator which is sandwiched between the two plates 12 and 14 is constructed in a similar manner to that shown in FIG. 1 and comprises a circular coil 7 straddled by U-shaped pole pieces 6 and 6a. The pole pieces are arranged around the coil so that the bridging section of each U-shaped pole piece is alternately radially outside and radially inside the coil so that a current flowing through the coil will produce alternate North and South poles at the open ends of the U-shaped pole pieces.

Although not shown commutating means may be provided to reverse the current flowing through the coil 7 so as to produce a rotating magnetic field around the stator or alternating current may be supplied to the coil 7 so as to produce the same effect.

By using the thicker sections of magnetic material to form the plates 12 and 14 the steel of the rotor plates 2 and 4 incorporated in the previous design is eliminated from the magnetic paths in the armature assembly formed by the two rotors and the increased effective magnetic path length reduces the total flux pulsation for a given magnetomotive force exerted from the armature assembly thus reducing the hysteresis loss.

Figure 7:
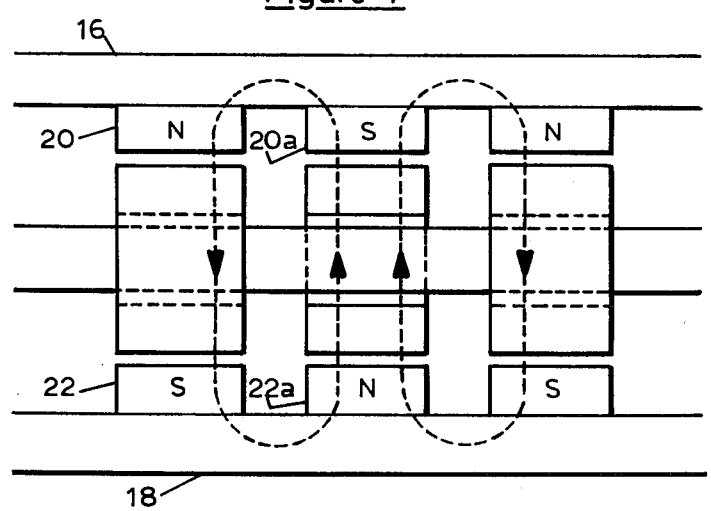

FIG. 7 is an embodiment of the fourth aspect of the invention in which a similar principle is used but this time the two rotors are formed by two rings 16 and 18 of soft iron or ferrite composite material which may be sintered on which are mounted two circular arrays of permanent magnets 20, 20a and 22, 22a. The permanent magnets are arranged so as to present alternate North and South poles to the sandwiched stator assembly which is constructed in exactly the same way as described with reference to FIG. 6.

As with the FIG. 6 embodiment, the use of soft iron or sintered ferrite composite material reduces the eddy current losses to a small amount.

We claim:

1. An electromagnetic machine having a first array of magnets, a magnetic path between pairs of magnets in the first array, a second array of permanent magnets arranged parallel to the first array, a magnetic path between pairs of the magnets in the second array, an array of pole pieces arranged between the first and second arrays of permanent magnets, the first and second arrays of magnets and the array of pole pieces being movable relative to one another and coil means arranged to magnetise the pole pieces, the arrangement being such that a magnetic path can be provided between a pair of magnets in the first array and a pair of magnets in the second array via a pair of the pole pieces in which the magnetic path between magnets in each of the said first and second arrays of magnets comprises a backing member of magnetisable material which is laminated at least in the direction of the magnetic path between the pairs of the magnets in the said arrays and in which adjoining pole pieces are radially inwardly and outwardly relatively displaced.

2. An electromagnetic machine as set forth in claim 1 characterized in that the set of pole pieces in which the bridging section of each piece is radially outermost are of different form from the set of pole pieces in which the bridging section of each pole piece is radially inmost.

3. An electromagnetic machine having a first array of permanent magnets, a magnetic path between pairs of the magnets in the first array, a second array of permanent magnets arranged parallel to the first array, a magnetic path between pairs of the magnets in the second array, pole pieces arranged between the first and second arrays of permanent magnets, and the first and second arrays of magnets and the array of pole pieces being movable relative to one aother and coil means arranged to magnetise the pole pieces, the arrangement being such that a magnetic path can be provided between a pair of magnets in the first array and a pair of magnets in the second array via a pair of the pole pieces characterized in that adjoining pole pieces are radially inwardly and outwardly relatively displaced.

4. An electromagnetic machine as set forth in claim 3 characterized in that the pole pieces are laminated.

5. An electromagnetic machine as set forth in claim 3 characterized in that the set of pole pieces in which the bridging section of each piece is radially outermost are of different form from the set of pole pieces in which the bridging section of each pole piece is radially inmost.

* * * * *